United States Patent
Hou et al.

(10) Patent No.: US 12,291,963 B2
(45) Date of Patent: May 6, 2025

(54) ESTIMATION OF FLUID SATURATION OF A FORMATION FROM INTEGRATION OF MULTIPLE WELL LOGS

(71) Applicant: Schlumberger Technology Corporation, Sugar Land, TX (US)

(72) Inventors: Chang-Yu Hou, Cambridge, MA (US); Lin Liang, Belmont, MA (US); Lalitha Venkataramanan, Lexington, MA (US); Harish Baban Datir, Tananger (NO); Austin Boyd, Ridgefield, CT (US); Vasileios-Marios Gkortsas, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 889 days.

(21) Appl. No.: 17/310,988

(22) PCT Filed: Mar. 10, 2020

(86) PCT No.: PCT/US2020/021924
§ 371 (c)(1),
(2) Date: Sep. 3, 2021

(87) PCT Pub. No.: WO2020/185801
PCT Pub. Date: Sep. 17, 2020

(65) Prior Publication Data
US 2022/0082014 A1 Mar. 17, 2022

Related U.S. Application Data

(60) Provisional application No. 62/816,639, filed on Mar. 11, 2019.

(51) Int. Cl.
*E21B 49/00* (2006.01)
*E21B 47/12* (2012.01)
*G01V 3/34* (2006.01)

(52) U.S. Cl.
CPC ............ *E21B 49/005* (2013.01); *E21B 47/12* (2013.01); *G01V 3/34* (2013.01); *G01V 2210/66* (2013.01)

(58) Field of Classification Search
CPC ......... E21B 49/005; E21B 47/12; G01V 3/34; G01V 2210/66
See application file for complete search history.

(56) References Cited

U.S. PATENT DOCUMENTS

| 4,769,606 A | 9/1988 | Vinegar et al. |
| 2003/0105590 A1 | 6/2003 | Mollison et al. |

(Continued)

FOREIGN PATENT DOCUMENTS

| WO | 2017058043 A1 | 4/2017 | |
| WO | WO-2017086951 A1 * | 5/2017 | ............. E21B 49/00 |

(Continued)

OTHER PUBLICATIONS

Archie, G. E., "The Electrical Resistivity Log as an Aid in Determining Some Reservoir Characteristics", Transactions of the AIME, 1942, 146(1), pp. 54-62.

(Continued)

*Primary Examiner* — Bijan Mapar
(74) *Attorney, Agent, or Firm* — Jeffrey D. Frantz

(57) ABSTRACT

Methods and systems are provided characterizing a formation traversed by a wellbore, wherein the formation includes at least a flushed zone and an uninvaded zone, which involve obtaining well log data based on plurality of different well log measurements of the formation at multiple depths in the wellbore. The well log data is used by a computational model that solves for a set of petrophysical parameters that characterize a portion of the formation corresponding to the multiple depths in the wellbore, wherein the set of petrophysical parameters include a cementation exponent, a saturation exponent, and a flushed zone water resistivity. The solved-for set of petrophysical parameters can be used to determine a value of water saturation of the uninvaded zone for the portion of the formation corresponding to the multiple depths in the wellbore.

14 Claims, 12 Drawing Sheets

(56) References Cited

U.S. PATENT DOCUMENTS

| | | | |
|---|---|---|---|
| 2012/0043966 A1* | 2/2012 | Montaron | G01V 5/104 |
| | | | 324/324 |
| 2014/0074406 A1 | 3/2014 | Skelt | |
| 2017/0254924 A1* | 9/2017 | Nikitenko | G01V 3/28 |
| 2020/0132875 A1* | 4/2020 | Zhang | E21B 47/003 |

FOREIGN PATENT DOCUMENTS

| | | |
|---|---|---|
| WO | 2017184122 A1 | 10/2017 |
| WO | 2019236489 A1 | 12/2019 |

OTHER PUBLICATIONS

Waxman, M. H et al., "Electrical Conductivities in Oil-Bearing Shaly Sand", Society of Petroleum Engineers Journal, 1968,. 8(2), pp. 107-122.

Waxman, W. H et al., "Electrical Conductivities in Shaly Sands—I. The Relation Between Hydrocarbon Saturation and Resistivity Index; II. The Temperature Coefficient of Electrical Conductivity", SPE-4094-PA, Journal of Petroleum Technology, 1974, 26 (2), pp. 213-225.

Hizem, M. et al., "Dielectric Dispersion: a New Wireline Petrophysical Measurement", SPE-116130-MS, presented at the SPE Annual Technical Conference and Exhbition, Dember, Colorado, 2008, 21 pages.

Liang, L. et al., "Estimating petrophysical parameters and average mud-filtrate invasion rates using joint invrsion of Induction logging and pressure transient data", Geophysics, 2011, 76(2), pp. E-21-E34.

Ramakrishnan, T. et al., Water-Cut and Fractional-Flow Logs From Array-Induction Measurements, SPE-36503-MS, presented at the SPE Annual Technical Conference and Exhibition, Denver, Colorago, U.S.A., 1996, 83 pages.

Liu, Q.H et al., "Numerical mode-matching method for the multiregion vertically stratified media (EM wave propagation)", IEEE Transactions on Antennas and Propagation, 1990, 38 (4), pp. 498-506.

Search Report and Written Opinion of related International Patent Application No. PCT/US2020/021924 dated Jul. 1, 2020, 8 pages.

International Preliminary Report on Patentability of related International Patent Application No. PCT/US2020/021924 dated Sep. 23, 2021, 7 pages.

* cited by examiner

ESTIMATION OF FLUID SATURATION OF A FORMATION FROM INTEGRATION OF MULTIPLE WELL LOGS

CROSS-REFERENCE TO RELATED APPLICATION(S)

The present disclosure is a National Stage Entry of International Application No. PCT/US2020/021924, filed Mar. 10, 2020, which claims priority from U.S. Provisional Patent Appl. No. 62/816,639, filed on Mar. 11, 2019, herein incorporated by reference in its entirety.

BACKGROUND

1. Field

The present disclosure relates to well logging to obtain measurements of a formation as well as interpretation of such measurements to determine petrophysical properties that characterize the formation.

2. State of the Art

During the drilling of a wellbore, drilling fluid (such as mud) is introduced into the wellbore under pressure in order to flush rock chips and other unwanted debris out of the wellbore. Such pressure is typically greater than the pressure of the formation traversed by the wellbore in order to prevent a phenomenon known as well blowout. The resultant pressure differential between the pressure of the drilling fluid and the formation pressure forces drilling fluid filtrate (commonly referred to as "mud filtrate") into the permeable formation and deposits solid particles of the drilling fluid on the wellbore wall forming a mudcake. The mudcake typically has a very low permeability. Once developed, the mudcake can reduce the rate of further mud filtrate invasion into the formation. In a region very close to the wellbore wall, most of the original formation water and some of the hydrocarbons may be flushed away by the mud filtrate. This region is known as the "flushed zone", or the "invaded zone". If the flushing is complete, the flushed zone pore space contains only mud filtrate; in addition, if the flushed zone was originally hydrocarbon bearing, it would contain only residual hydrocarbons. Further out from the wellbore wall, the displacement of the formation fluids by the mud filtrate is less and less complete thereby resulting in a second region, this second region undergoing a transition from mud filtrate saturation to original formation water saturation. The second region is known as the "transition zone". The extent or depth of the flushed and transition zones depends on many parameters, among them being the type and characteristics of the drilling fluid, the formation porosity, the formation permeability, the pressure differential, and the time since the formation was first drilled. The undisturbed formation beyond the transition zone is known as the "uninvaded" or "virgin" or "uncontaminated" zone.

FIG. 1 is a schematic cross section of a wellbore, showing the results of the mud invasion process during drilling the wellbore. The wellbore is filled with drilling fluid. A layer of mudcake covers the wellbore wall. The surrounding formation includes a flushed zone, a transition zone, and an uninvaded zone extending radially from the wellbore wall.

The flushed zone can be characterized by a resistivity $R_{XO}$, a water resistivity $R_{w,XO}$, a total porosity $\phi_T$, and a water saturation $S_{w,XO}$. Here, the total porosity $\phi_T$ is the volume fraction of the pore space of the flushed zone, while the $S_{w,XO}$ is the fraction of water with its resistivity, $R_{w,XO}$, that fills the pore space of the flushed zone. The resistivity $R_{XO}$ governs the electric current responses of the formation in the flushed zone, which is dominated by the electric conduction through the water that saturates the pore space of the flushed zone.

The uninvaded zone can be characterized by a resistivity $R_T$, a water resistivity $R_{w,T}$, the total porosity $\phi_T$, and a water saturation $S_{w,T}$. Here, the total porosity $\phi_T$ is the volume fraction of the pore space of the uninvaded zone, which is the same as that in the flushed zone. The $S_w$ is the fraction of water with its resistivity, $R_{w,T}$, that fills the pore space of the uninvaded zone. The $R_T$ is the true formation resistivity in the uninvaded zone, which is dominated by the electric conduction through the water that saturates the pore space of the uninvaded zone.

The characterization and evaluation of the water saturation $S_w$ of the uninvaded zone is used to quantify the hydrocarbon content of the reservoir and thus is an important factor in estimating the value of the hydrocarbon content of the reservoir. Furthermore, evaluating water saturation of the uninvaded zone during production can be useful in monitoring and controlling water flooding in some enhanced oil recovery processes.

In order to accurately measure the water saturation $S_w$ of the uninvaded zone, suitable petrophysical parameters, such as cementation exponent m, saturation exponent n and brine resistivity $R_w$, are required for formations obeying Archie's saturation equation. For shaly sand formation, additional formation property, cation exchange capacity (CEC) or $Q_v$, is also needed. Conventionally, all these petrophysical parameters are obtained from laboratory core measurements, which can take months to complete. Furthermore, the core measurements only represent limited depths of formation properties. In addition, measurement procedures for extracting these petrophysical parameters, such as CEC or $Q_v$, are not standardized, which can cause variation of measurement results from different laboratory. Also, laboratory measurements are not performed in the downhole conditions.

SUMMARY

Methods and systems are provided characterizing a formation traversed by a wellbore, wherein the formation includes at least a flushed zone and an uninvaded zone, which involve obtaining well log data based on plurality of different well log measurements of the formation at multiple depths in the wellbore. The well log data is used by a computational model that solves for a set of petrophysical parameters that characterize a portion of the formation corresponding to the multiple depths in the wellbore, wherein the set of petrophysical parameters include a cementation exponent, a saturation exponent, and a flushed zone water resistivity. The solved-for set of petrophysical parameters can be used to determine a value of water saturation of the uninvaded zone for the portion of the formation corresponding to the multiple depths in the wellbore.

In embodiments, the methods and systems can efficiently and effectively quantify water saturation of the uninvaded zone of a formation from a number of well logging measurements. The methods and systems can avoid external input from either prior knowledge or from the laboratory measurement.

In embodiments, the plurality of different well logging measurements can include at least one relatively deep resistivity measurement of the uninvaded zone of the formation in combination with at least one additional well logging measurement.

In embodiments, the methods and systems can be configured to combine the plurality of different well logging measurements using a suitable algorithm and one or more physical models that are configured to solve for a set of petrophysical parameters that include the cementation exponent m (or m*) and the saturation exponent n (or n*) of a suitable saturation model along with a water resistivity (either at the flush zone or at the uninvaded zone depending on the combined log). The set of petrophysical parameters (e.g., m (or m*), n (or n*), water resistivity either at the flush zone or at the uninvaded zone, and possibly CEC or $Q_v$) can be used to quantify the water saturation $S_w$ of the uninvaded zone based on suitable models.

In embodiments, the plurality of different well logging measurements can be performed at multiple depths in the wellbore and/or in multiple radial depths of investigation.

In embodiments, for the case where the set of well logging measurements do not vary in radial depth of investigation, the set of well logging measurements can include well logging measurements of resistivity $R_{XO}$ of the flushed zone (for example, by a micro-resistivity logging tool, induction logging tool or laterlog tool), total porosity $\phi_T$ of the uninvaded zone (for example, by a neutron-density logging tool or ELAN logging analysis) and water saturation $S_{w,XO}$ of the flushed zone (for example, from a dielectric logging tool or NMR logging tool).

In other embodiments, for example in a water-base-mud (WBM) scenario, the set of well logging measurements can include measurements performed at multiple radial depths of investigation (for example, by an array induction logging tool) and a physical model of the hydrocarbon-containing uninvaded zone can be solved to determine the cementation exponent m, the saturation exponent n and potentially the water resistivity $R_{w,T}$ of the uninvaded zone with fewer measurements of varying wellbore depth.

DETAILED DESCRIPTION OF THE PREFERRED EMBODIMENTS

Figure 1:
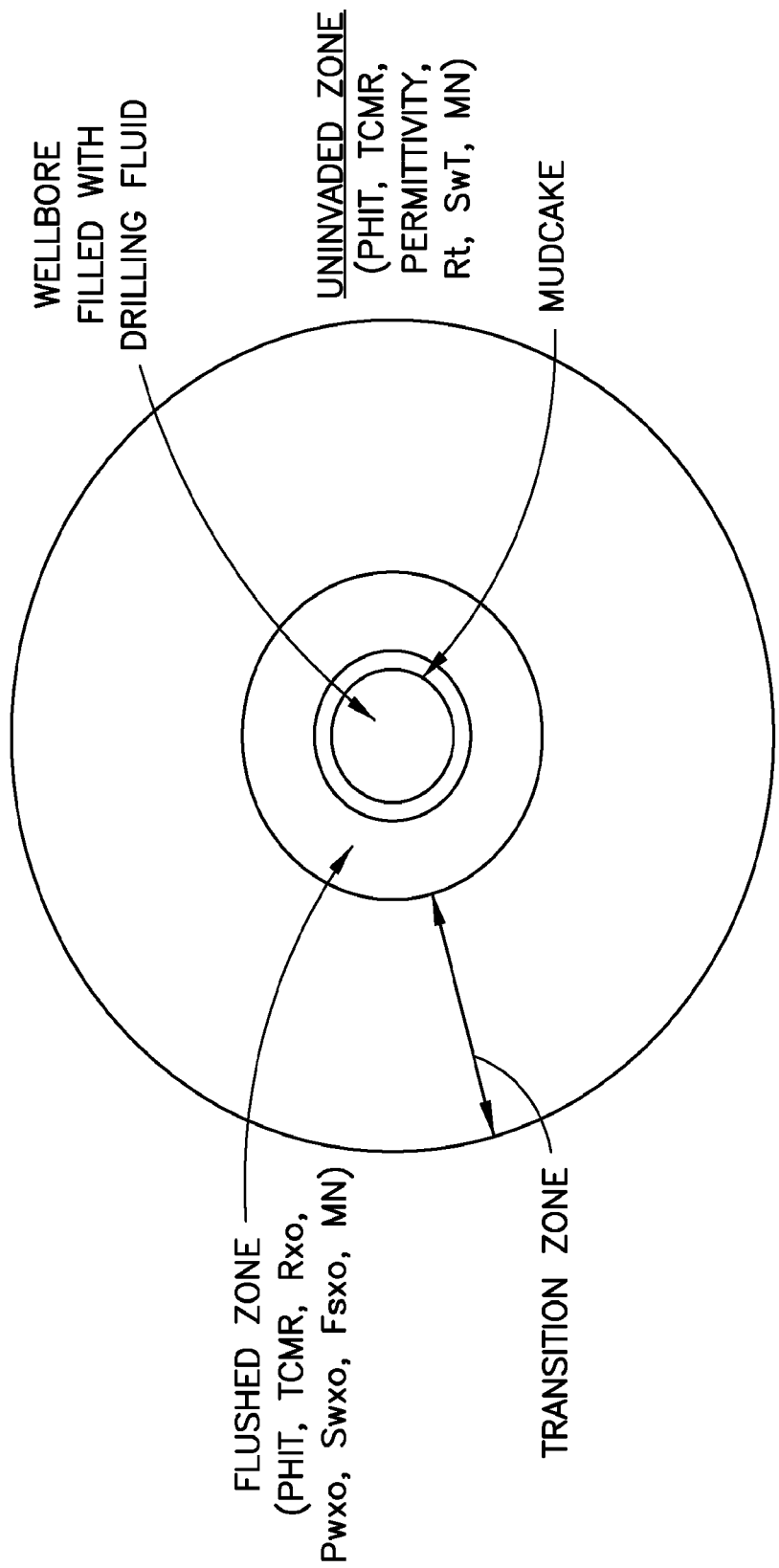
FIG. 1 is a schematic cross-sectional view of a wellbore that traverses a formation, including the zones that result from invasion of drilling fluid into the formation as a result of the drilling the wellbore.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

In embodiments, methods and systems are provided that efficiently and effectively quantify water saturation of the uninvaded zone of a formation from a number of well logging measurements. The methods and systems can avoid external input from either prior knowledge or from the laboratory measurement.

In embodiments, the number of well logging measurements can include at least one relatively deep resistivity measurement of the uninvaded zone of the formation in combination with at least one additional well logging measurement.

In embodiments, the methods and systems can be configured to combine the number of well logging measurements using a suitable algorithm and one or more physical models that are configured to solve for a set of petrophysical parameters that include the cementation exponent m (or m*) and the saturation exponent n (or n*) of a suitable saturation model along with a water resistivity (either at the flush zone or at the uninvaded zone depending on the combined log). The cementation exponent m (or m*) models how much the pore network of the formation rock increases the resistivity of the formation rock, as the rock itself is assumed to be non-conductive. The saturation exponent n (or n*) models the dependency on the presence of non-conductive fluid (hydrocarbons) in the pore-space, and is related to the wettability of the rock. Water-wet rocks will, for low water saturation values, maintain a continuous film along the pore walls making the rock conductive. Oil-wet rocks will have discontinuous droplets of water within the pore space, making the rock less conductive. The set of petrophysical parameters can also include a cation exchange capacity (CEC) or $Q_v$ property, which accounts for clay minerals in the formation rock. The set of petrophysical parameters (e.g., m (or m*), n (or n*), water resistivity either at the flush zone or at the uninvaded zone, and possibly CEC or $Q_v$) can be used to quantify the water saturation $S_w$ of the uninvaded zone based on suitable models.

In embodiments, the number of well logging measurements can be performed at multiple depths in the wellbore and/or in multiple radial depths of investigation.

In embodiments, for the case where the set of well logging measurements do not vary in radial depth of investigation, the set of well logging measurements can include well logging measurements of resistivity $R_{XO}$ of the flushed zone (for example, by a micro-resistivity logging tool, induction logging tool or laterlog tool), total porosity $\phi_T$ of the uninvaded zone (for example, by a neutron-density logging tool or ELAN logging analysis) and water saturation $S_{w,XO}$ of the flushed zone (for example, from a dielectric logging tool or NMR logging tool).

In other embodiments, for example in a water-base-mud (WBM) scenario, the set of well logging measurements can include measurements performed at multiple radial depths of investigation (for example, by an array induction logging tool) and a physical model of the hydrocarbon-containing uninvaded zone can be solved to determine the cementation exponent m, the saturation exponent n and potentially the water resistivity $R_{w,T}$ of the uninvaded zone with fewer measurements of varying wellbore depth.

Figure 2:
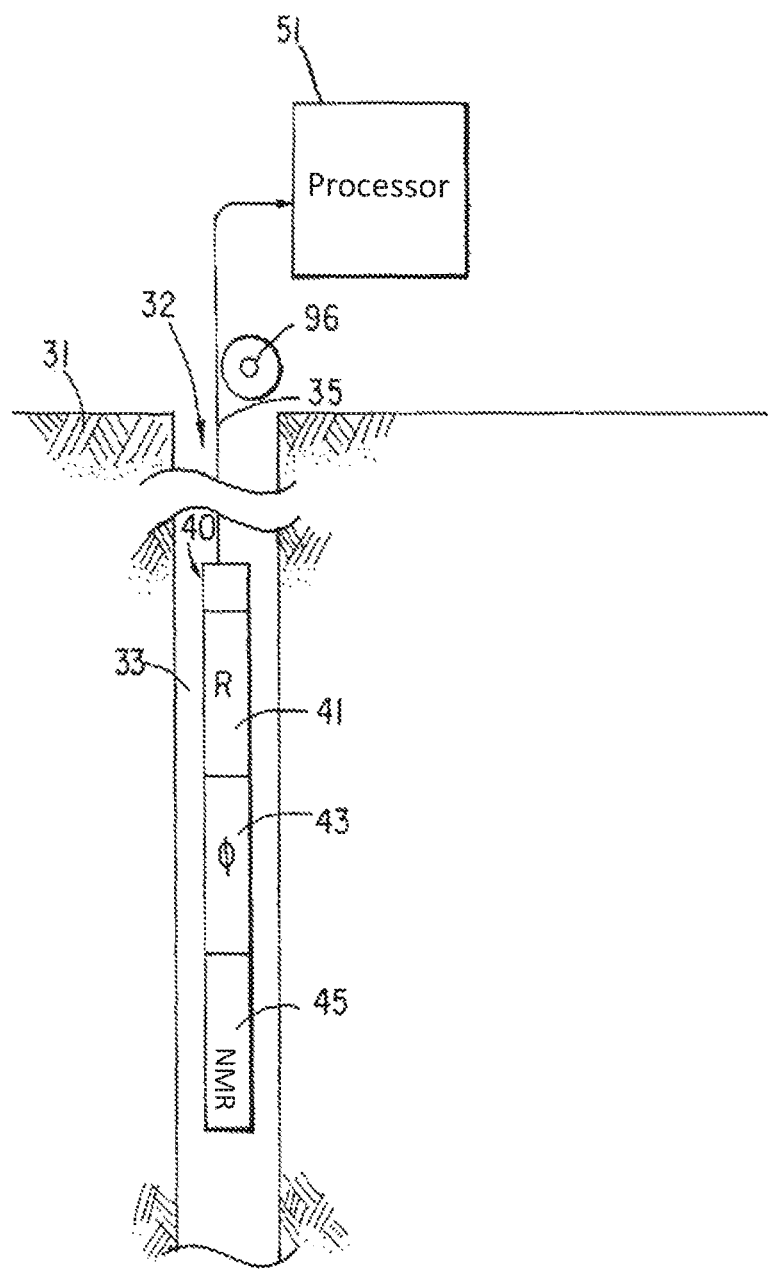
FIG. 2 is a schematic diagram of an exemplary wellsite system according to the present disclosure.

FIG. 2 shows an apparatus which can be used to practice an embodiment of the present disclosure for investigation of an earth formation 31 traversed by a wellbore 32, which is filled with a drilling fluid 33. A logging device 40 is suspended in the wellbore 32 on an armored cable 35, the length of which substantially determines the depth of the downhole logging device 40. The cable length is controlled by conventional means at the surface (not shown). A processor 51, shown at the surface, although portions thereof may be downhole, represents processing circuitry for the various logging measurements performed by the logging device 40. A sheave wheel 96 can be conventionally provided for determination of depth of the logging device 40, and signals therefrom are coupled to the processor 51 for integration with the logging measurements.

The downhole logging device 40 of the present embodiment comprises a tool string that includes a number of tools. In the present embodiment, the reference numeral 41 represents one or more resistivity tools that measure the resistivity of the surrounding formation. The resistivity tool(s) can include a micro-resistivity tool, multi-depth array induction tool or lateral log tool as are well known in the arts. Note that resistivity and conductivity are inverses, and it will be understood that references herein to one of these imply that the other could be substituted, in an inverse sense. The array induction tool can be configured to measure resistivity at varying radial depths of investigation (DOI) that extend from the wellbore wall into the formation.

The tool string of downhole apparatus 40 also includes, in this embodiment, a logging device 43 which is used to obtain measurements of total porosity $\phi_T$ of the formation. This logging tool may comprise, for example, a conventional type of neutron-density logging device or other suitable tool measurements that combine nuclear, density, lithology tools for ELAN logging analysis.

Further included in the tool string is an NMR logging device 45 which can be used to measure the water saturation $S_{w,XO}$ in the flushed zone, for example by analysis of a measured NMR T2 distribution with a proper choice of T2 cutoff. Alternatively or additionally, the tool string can include a dielectric tool (not shown) whose log measurements can be interpreted to determine the water resistivity $S_{w,XO}$ in the flushed zone.

The tool string can also typically include appropriate conventional telemetry equipment and power supplies (not separately shown), as well as other logging subassemblies conventionally used with equipment of this type. It will also be understood that at least some of the measurements hereof could be made by equipment on a drill string as part of a logging-while drilling tool string.

For clean sandstone and carbonate formation, the resistivity saturation evaluation is largely based on the Archie's equation (Archie, 1942):

$$R_f(m,n,R_w,\phi_T,S_w)=R_w\phi_T^{-m}S_w^{-n}, \qquad \text{(Eq. 1)}$$

where $R_f$ is the formation resistivity, $\phi_T$ is the total porosity of the formation, m is the cementation exponent, n is the saturation exponent, $R_w$ is the water resistivity. This Archie's equation can in principle be applied to both the invaded and uninvaded zones with the assumption that the exponents, m and n, and the total porosity $\phi_T$ are the same at two zones. For the invaded zone, one has the formation resistivity $R_f=R_{XO}$, the water resistivity $R_w=R_{w,XO}$, and the water saturation $S_w=S_{w,XO}$. For uninvaded zone, one has the formation resistivity $R_f=R_T$, the water resistivity $R_w=R_{w,T}$, and the water saturation $S_w=S_{w,T}$. See Archie, G. E., 1942, "The Electrical Resistivity Log as an Aid in Determining Some Reservoir Characteristics," rans. of AIME 146 (1): 54-62.

For more complicate formations, such as shaly sand formation, one representative saturation equation is the Waxman-Smith saturation equation (Waxman and Smits, 1968; Waxman and Thomas, 1974):

$$\frac{1}{R_f^{WS}(m^*, n^*, R_w, Q_v, \phi_T, S_w)} = \phi_T^{-m^*} S_w^{-n^*}\left(\frac{1}{R_w} + \frac{B \cdot Q_V}{S_w}\right), \qquad \text{(Eq. 2)}$$

where $R_f^{WS}$ is the formation resistivity, $Q_v$ is the excess charge density in meq/cm³ due to the presence of clay, B is the constant converting the excess charge density to conductivity. Here the star superscript at both exponents, m* and n* indicates that they are not the same as exponents in Archie's equation. Eq. (2) can in principle be applied to both invaded and uninvaded zone with the assumption that the exponents, m and n, the total porosity $\phi_T$ and the $Q_v$ are the same at two zones. For invaded zone, one has the formation resistivity $R_f=R_{XO}$, the water resistivity $R_f=R_{w,XO}$, and the water saturation $S_w=S_{w,XO}$. For uninvaded zone, one has the formation resistivity $R_f=R_T$, the water resistivity $R_w=R_{w,T}$, and the water saturation $S_w=S_{w,T}$. See Waxman, M. H. and Smits, L. J. M., 1968, "Electrical Conductivities in Oil-Bearing Shaly Sands," SPE J. 8 (2): 107-122. SPE-1863-PA; and Waxman, M. H. and Thomas, E. C., 1974, "Electrical Conductivities in Shaly Sands-I. The Relation Between Hydrocarbon Saturation and Resistivity Index; II. The Temperature Coefficient of Electrical Conductivity," J Pet Technol 26 (2): 213-225. SPE-4094-PA. The resistivity saturation evaluation is largely based on these types of saturation models (equations), which requires the input of various petrophysical parameters.

The resistivity signals $R_f$ can be obtained by various resistivity logging tools, such as micro-resistivity, multi-depth induction tool and lateral log. Often, the resistivity of the flushed zone is denoted as $R_{xo}$, and the resistivity of the uninvaded zone is denoted as $R_T$ as described herein.

The total porosity $\phi_T$ of the formation can be obtained through either neutron-density logs or standard ELAN analysis combining multiple nuclear, density, lithology tools.

The water saturation $S_{w,XO}$ in the flushed zone can be obtained from interpretation of NMR tool measurements, such as the analysis of NMR T2 distribution with a proper choice of T2 cutoff, for the case where the flushed zone has minimum water saturation and thus corresponds to an irreducible water zone. Alternatively, the water saturation $S_{w,XO}$ in the flushed zone can be obtained from interpretation of the multifrequency dielectric measurements, for examples as described in Hizem, M., Budan, H., Deville, B., Faivre, O., Mosse, L., and Simon, M., 2008, "Dielectric dispersion: a new wireline petrophysical measurement," SPE ATCE Trans., paper SPE-116130.

In accordance with embodiments of the present disclosure, a formation can be modelled as multiple zones with similar properties stretching across a finite thickness. Furthermore, the embodiments can assume that the formation satisfies Archie's equation. In other embodiments, similar workflow can be established for more complicated formations using respective saturation equations.

Figure 3A:
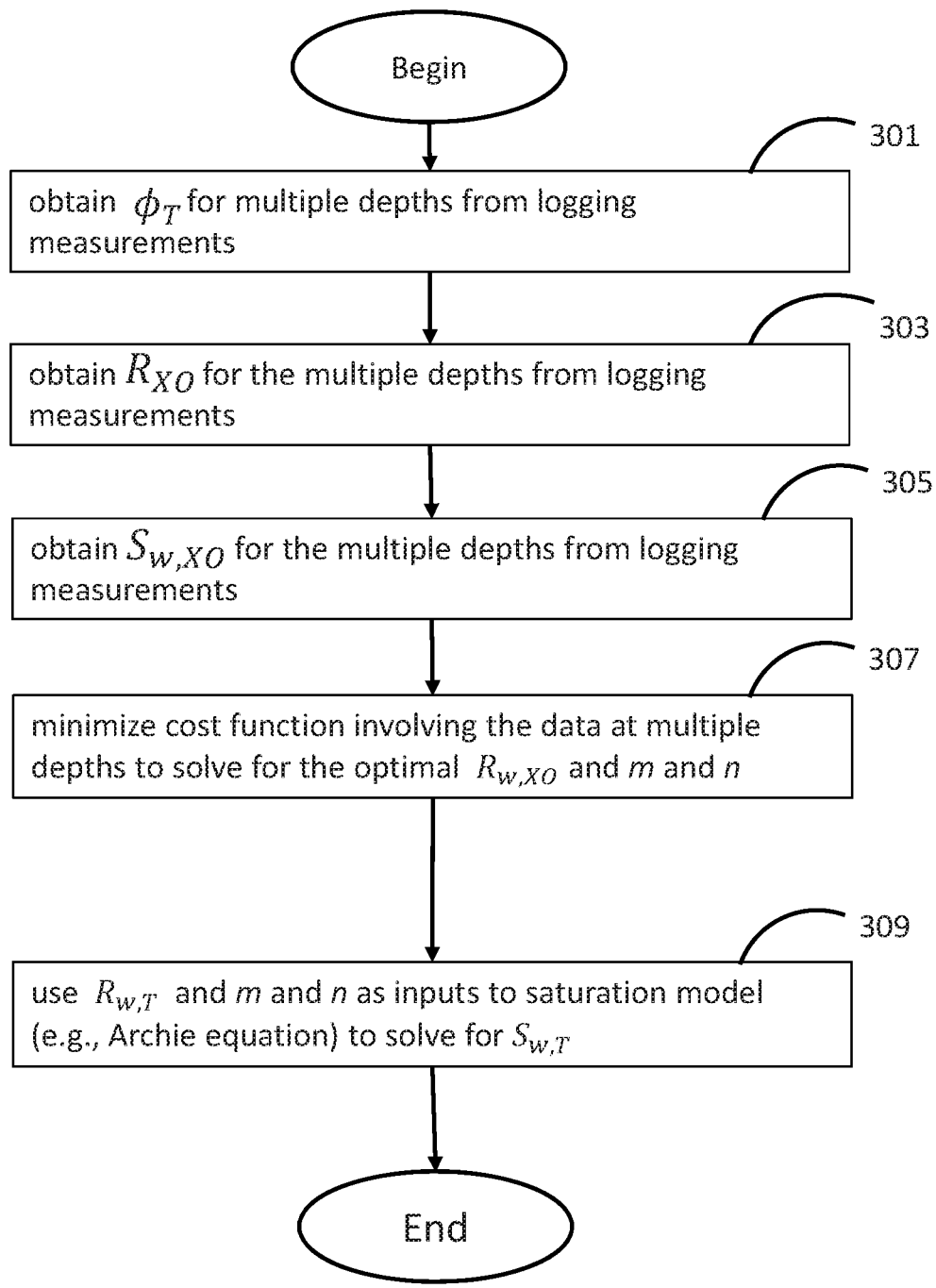
FIGS. 3A and 3B are flowcharts illustrating a workflow for quantifying water saturation of the uninvaded zone of a formation from multiple well logging measurements according to a first embodiment of the present disclosure.
Figure 3B:
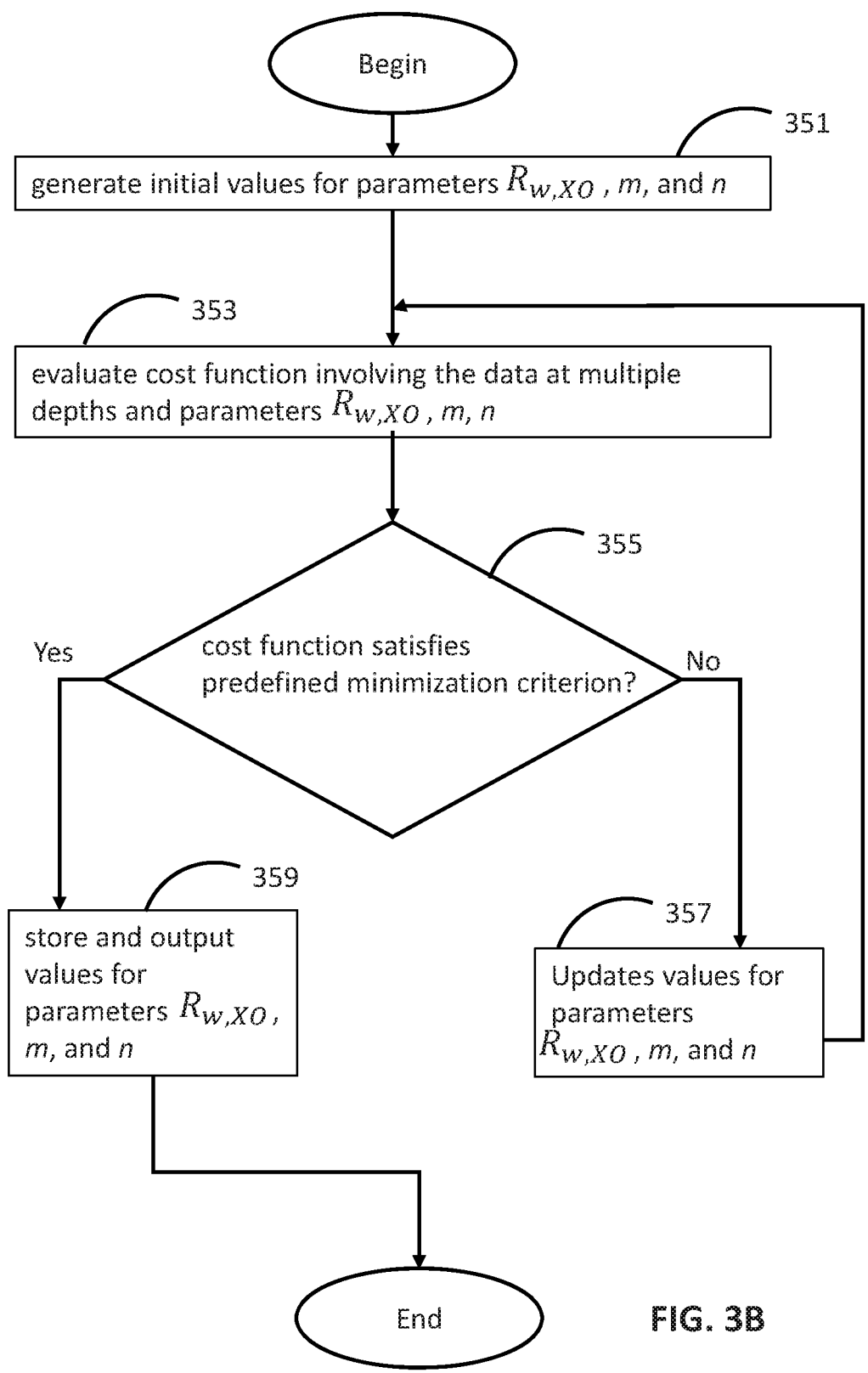

FIGS. 3A and 3B illustrate an exemplary workflow according to a first embodiment of the present disclosure, which can be applied to cases that use oil-based drilling fluid or water-based drilling fluid. For the case of oil-based drilling fluid, one can assume $R_{xo}=R_T$, while an additional method/measurement is used to determine $R_T$.

At 301, the total porosity $\phi_T$ at multiple depths in the wellbore is obtained from well logging measurements at the multiple depths in the wellbore. Such well logging measurements can be performed by a conventional type of neutron-density logging device or other suitable tool measurements that combine nuclear, density, lithology tools for ELAN logging analysis (e.g., tool 43 of FIG. 2).

At 303, the resistivity $R_{xo}$ of the flushed zone at the multiple depths in the wellbore is obtained from well logging measurements at the multiple depths in the wellbore. Such well logging measurements can be performed by micro-resistivity, multi-depth induction logging tool or lateral log tool (e.g., tool 41 of FIG. 2).

At 305, the water saturation $S_{w,XO}$ of the flushed zone at the multiple depths in the wellbore is obtained from well logging measurements at the multiple depths in the wellbore. Such well logging measurements can be performed by an NMR tool or dielectric tool (e.g., tool 45 of FIG. 2).

At 307, under the assumption that the formation within the considered thickness covered by the multiple depths of the logging measurements have similar petrophysical properties, a cost function can be defined that uses a saturation model (such as the Archie saturation model of Eq. (1)) to relate the measured $\phi_T$, $R_{XO}$, and $S_{w,XO}$ values at the multiple depths to values of m, n and the water resistivity $R_{w,XO}$ of the flushed zone. This cost function can be minimized to find values of m, n and $R_{w,XO}$ that fit the measured data. In this case, the values of m, n and $R_{w,XO}$ characterize that portion (thickness) of the formation corresponding to the multiple depths of the underlying logging measurements of steps 301 to 305. Exemplary operations that minimize the cost function to solve for values of m, n and $R_{w,XO}$ are set shown in steps 351 to 359 of FIG. 3B.

In one embodiment, given the measurements of $\phi_{T,i}$, $R_{XO,i}$, and $S_{w,XO,i}$ for i=1, ..., N depths, the best value of m, n and $R_{w,XO}$ that fits all the data can be found by minimizing the following cost function:

$$\text{cost} = \Sigma_{i=1}^{N}(R_{XO,i} - R_f(m,n,R_{w,XO},\phi_{T,i},S_{w,XO,i}))^2. \quad \text{(Eq. 3)}$$

Here $R_f$ is defined according to Eq. (1) where $R_{w,XO}$ is used for $R_w$ and $S_{w,XO,i}$ is used for $S_w$.

In other embodiments, different types of cost functions can also be used to invert for values of m, n and $R_{w,XO}$ to alleviate the effect of outlier data points. In the presence of measurement standard deviations, one can also weight each data points with the respective error to emphasize the data with less errors.

At 309, the values of m, n and water resistivity $R_{w,XO}$ for the flushed zone as determined in 307 is input to a saturation model (such as the Archie model of Eq.(1)) to quantify the water saturation $S_w$ of the uninvaded zone of the formation. In the case where the saturation model requires the water resistivity $R_{w,T}$ (connate water resistivity) of the uninvaded zone, the value for this parameter can be obtained from other measurements. For example, for the case of water-base drilling fluid, the value of $R_{w,T}$ can be obtained either from independent formation fluid measurements or from other complimentary workflows (such as those described in Grau, J., Miles, J., and Mosse, L., 2019, "Measuring Spectral Contributions of Elements in Regions In and About Borehole Using Borehole Spectroscopy Tool," PCT application PCT/US19/35231. In another example, for the case of oil-base drilling fluid mud, the value of $R_{w,T}$ can be assumed to be close to the value of the inverted $R_{w,XO}$, or to be obtained from other workflows (see Grau et. al, 2019). In this case, the value of the water saturation $S_w$ calculated in 309 characterizes the uninvaded zone for that portion (thickness) of the formation corresponding to the multiple depths of the underlying logging measurements of steps 301 to 305.

Figure 4A:
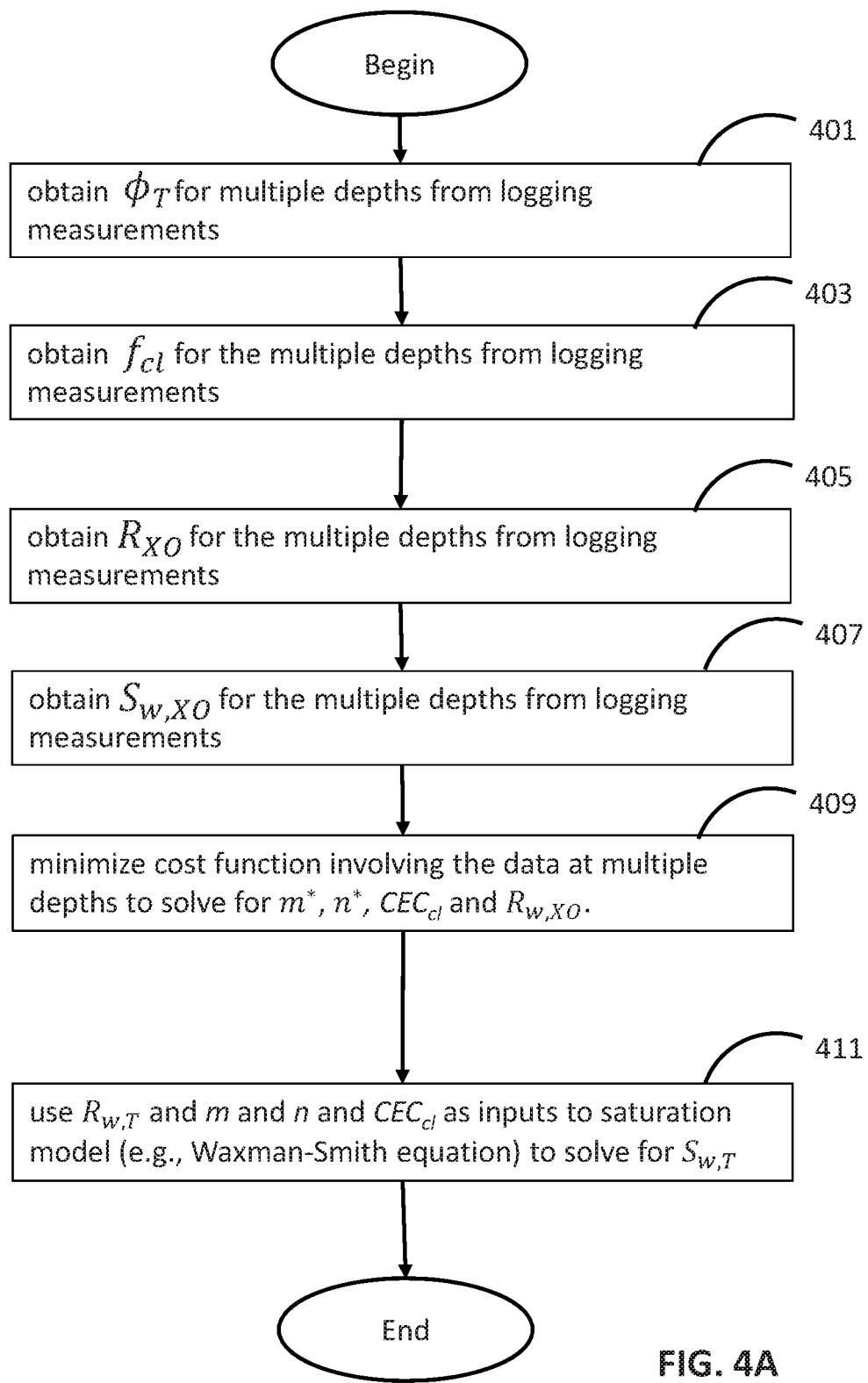
FIGS. 4A and 4B are flowcharts illustrating a workflow for quantifying water saturation of the uninvaded zone of a formation from multiple well logging measurements according to a second embodiment of the present disclosure.
Figure 4B:
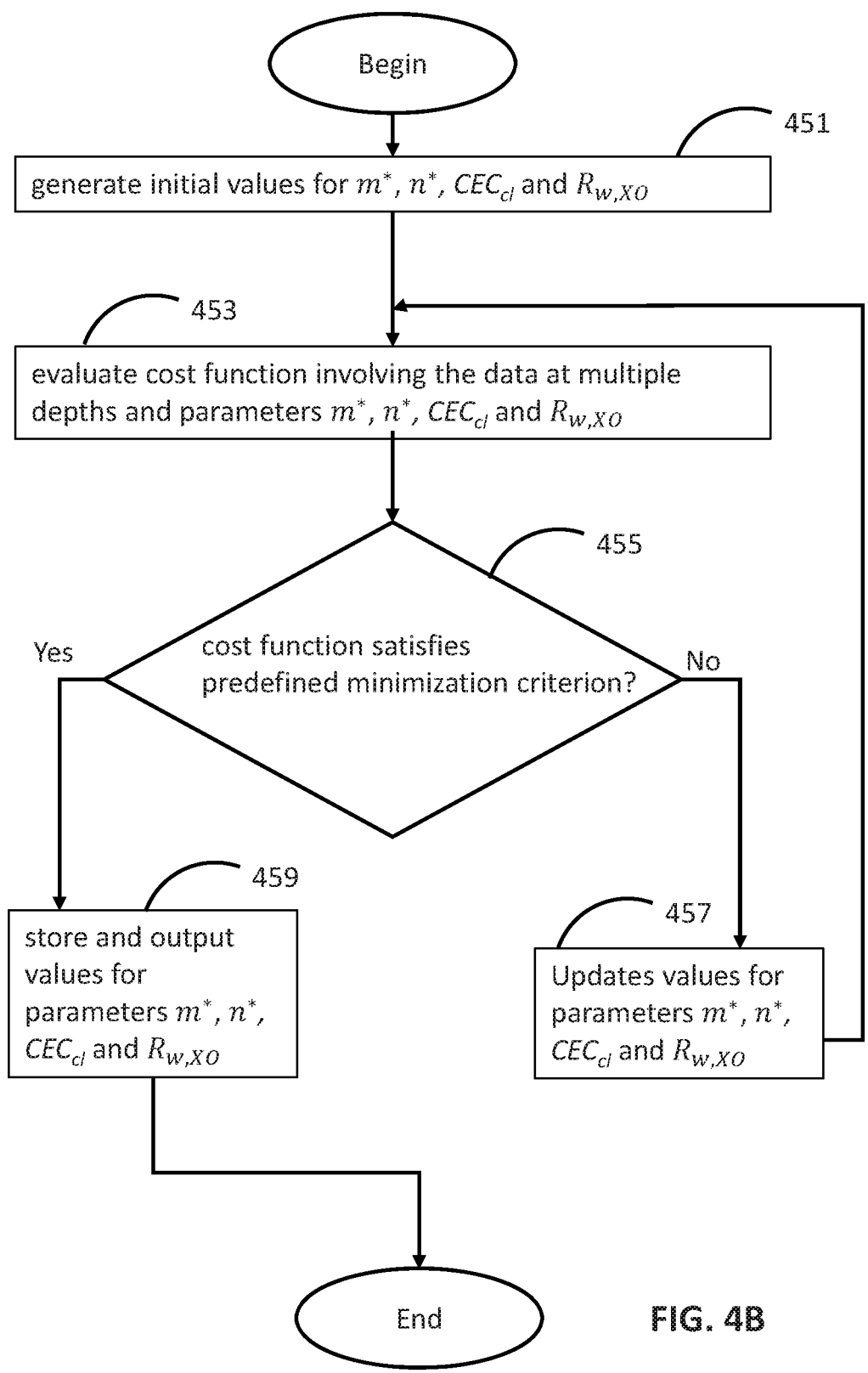

According to a second embodiment of the present disclosure, for more complicated formations such as a shaly sand formation, a similar workflow can be used to solve for values of m*, n*, $R_{w,XO}$ and $CEC_{clay}$. Here $CEC_{clay}$ in meq/g represents the averaged cation exchange capacity of the clay in the interested zone, which can be related to the $Q_v$ by the relation $$Q_v = f_{cl}\rho_{cl}CEC_{clay}\frac{1-\phi_T}{\phi_T}, \quad \text{(Eq. 4)}$$

with the knowledge of total clay volume fraction, $f_{cl}$ and the clay density $\rho_{cl}$ in g/cm³. The total clay volume fraction, $f_{cl}$, can be reasonably estimated through standard mineral analysis from logs, while the clay density is around $\rho_{cl} \approx 2.8$ g/cm³ without much of variation. With these additional assumptions and inputs, a similar workflow can be established as shown in FIGS. 4A and 4B. This workflow can be applied to cases that use oil-based drilling fluid or water-based drilling fluid.

At 401, the total porosity $\phi_T$ at multiple depths in the wellbore is obtained from well logging measurements at the multiple depths in the wellbore. Such well logging measurements can be performed by a conventional type of neutron-density logging device or other suitable tool measurements that combine nuclear, density, lithology tools for ELAN logging analysis (e.g., tool 43 of FIG. 2).

At 403, the clay volume fraction $f_{cl}$ at multiple depths in the wellbore is obtained from well logging measurements at the multiple depths in the wellbore. Such well logging measurements can be performed using suitable tool measurements that combine nuclear, density, lithology tools for ELAN logging analysis (e.g., tool 43 of FIG. 2).

At 405, the resistivity $R_{xo}$ of the flushed zone at the multiple depths in the wellbore is obtained from well logging measurements at the multiple depths in the wellbore. Such well logging measurements can be performed by micro-resistivity, multi-depth induction logging tool or lateral log tool (e.g., tool 41 of FIG. 2).

At 407, the water saturation $S_{w,XO}$ of the flushed zone at the multiple depths in the wellbore is obtained from well logging measurements at the multiple depths in the wellbore. Such well logging measurements can be performed by an NMR tool or dielectric tool (e.g., tool 45 of FIG. 2).

At 409, under the assumption that the formation within the considered thickness covered by the multiple depths of the logging measurements have similar petrophysical properties, a cost function can be defined that uses a saturation model (such as the Waxman-Smith saturation model of Eq. (2)) to relate the measured $\phi_T$, $f_{cl}$, $R_{XO}$, and $S_{w,XO}$ values at the multiple depths to values of $m^*$ $n^*$, $CEC_{cl}$ and the water resistivity $R_{w,XO}$ of the flush zone. This cost function can be minimized to find values of $m^*$, $n^*$, $CEC_{cl}$ and $R_{w,XO}$ that fit the measured data. In this case, the values of $m^*$, $n^*$, $CEC_{cl}$ and $R_{w,XO}$ characterize that portion (thickness) of the formation corresponding to the multiple depths of the underlying logging measurements of steps 401 to 407. Exemplary operations that minimize the cost function to solve for values of $m^*$, $n^*$, $CEC_{cl}$ and $R_{w,XO}$ are set shown in steps 451 to 459 of FIG. 4B.

In one embodiment, given the measurements of $\phi_{T,i}$, $R_{XO,i}$, $f_{cl,i}$ and $S_{w,XO,i}$ for i=1, . . . , N depths, the best value of $m^*$, $n^*$. $CEC_{cl}$ and $R_{w,XO}$ that fits the data can be found by minimizing the following cost function:

$$\text{cost} = \Sigma_{i=1}^{N}(R_{XO,i}-R_f^{WS}(m^*,n^*,R_{w,XO},CEC_{cl},f_{cl,i},\phi_{T,i},S_{w,XO,i}))^2. \quad (Eq.\ 5)$$

Here $R_f^{WS}$ is defined according to Eq. (2) where $R_{w,XO}$ is used for $R_w$, $S_{w,XO,i}$ is used for $S_w$, $Q_v$ is determined according to Eq. (4) above, and B is a predefined constant as described above.

In other embodiments, different types of cost functions can also be used to invert for values of $m^*$, $n^*$. $CEC_{cl}$ and $R_{w,XO}$ to alleviate the effect of outlier data points. In the presence of measurement standard deviations, one can also weight each data points with the respective error to emphasize the data with less errors.

At 411, the values of $m^*$, $n^*$ and water resistivity $R_{w,XO}$ for the flushed zone as determined in 409 is input to a saturation model (such as the Waxman-Smith saturation model of Eq. (2)) to quantify the water saturation $S_w$ of the uninvaded zone of the formation. In the case where the saturation model requires the water resistivity $R_{w,T}$ (connate water resistivity) of the uninvaded zone, the value for this parameter can be obtained from other measurements. For example, for the case of water-base drilling fluid, the value of $R_{w,T}$ can be obtained either from independent formation fluid measurements or from other complimentary workflows (such as those described in Grau, J., Miles, J., and Mosse, L., 2019, "Measuring Spectral Contributions of Elements in Regions In and About Borehole Using Borehole Spectroscopy Tool," PCT application PCT/US19/35231. In another example, for the case of oil-base drilling fluid mud, the value of $R_{w,T}$ can be assumed to be close to the value of the inverted $R_{w,XO}$, or to be obtained from other workflows (see Grau et. al, 2019). In this case, the value of the water saturation $S_w$ calculated in 411 characterizes the uninvaded zone for that portion (thickness) of the formation corresponding to the multiple depths of the underlying logging measurements of steps 401 to 407.

Figure 5A:
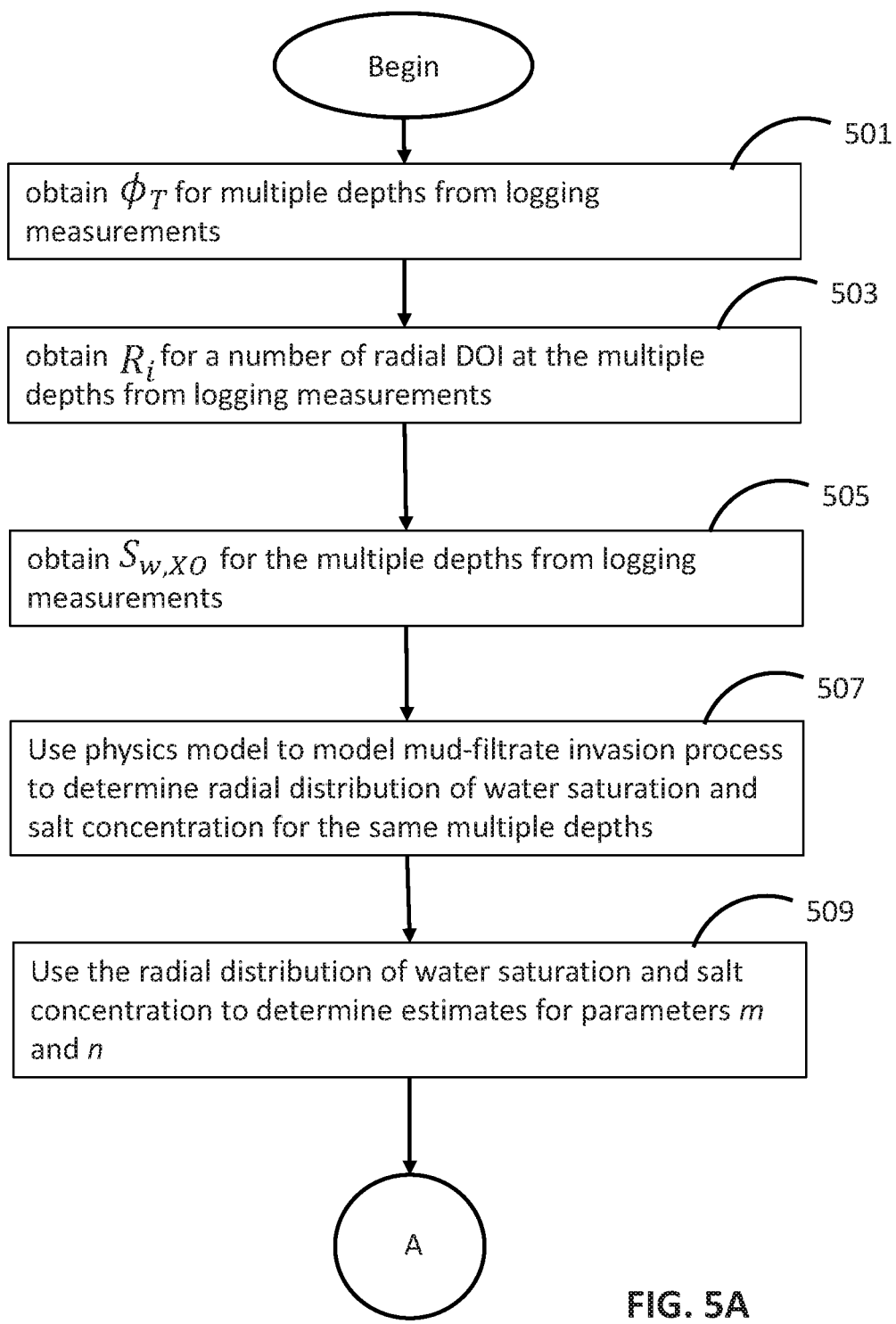
FIGS. 5A and 5B, collectively, is a flowchart illustrating a workflow for quantifying water saturation of the uninvaded zone of a formation from multiple well logging measurements according to a third embodiment of the present disclosure.
Figure 5B:
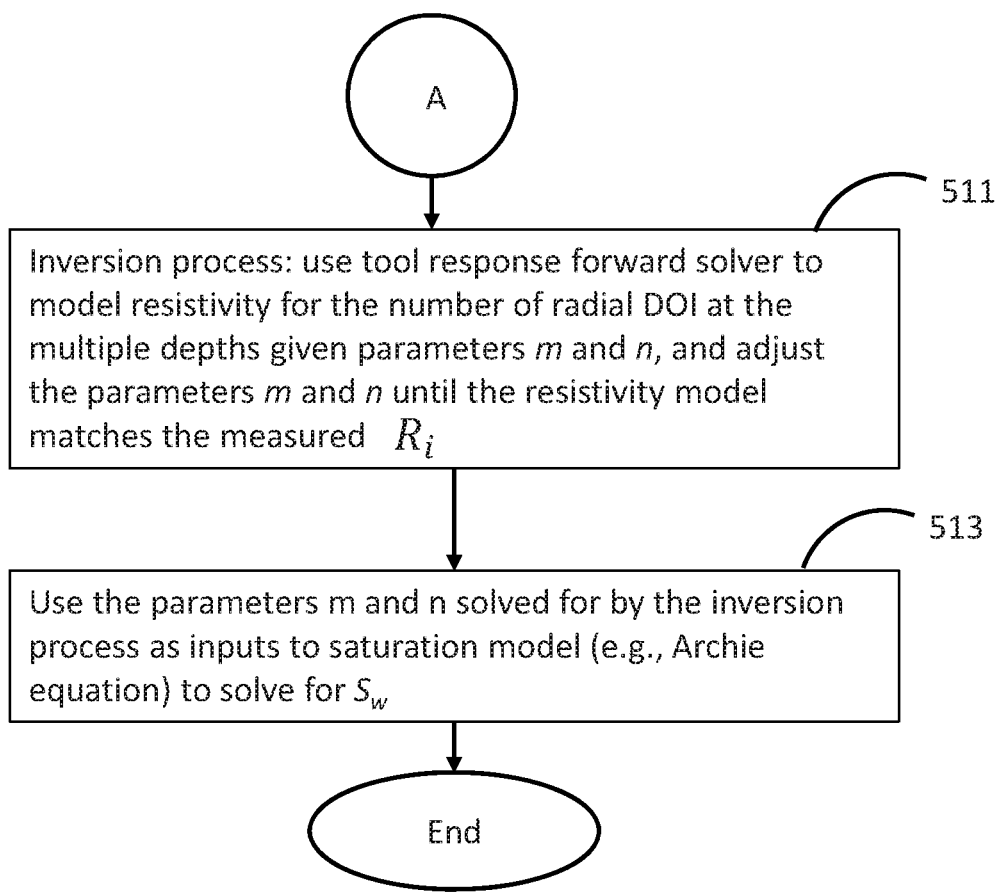

According to a third embodiment of the present disclosure, for the case of where the mud-filtrate invasion is water-based drilling fluid, a workflow can be provided that solves for values of m, n and $R_{w,T}$ from the resistivity data at the multiple radial depths of investigation in the oil zone of the formation as shown in FIGS. 5A and 5B.

At 501, the total porosity $\phi_T$ at multiple depths in the wellbore is obtained from well logging measurements at the multiple depths in the wellbore. Such well logging measurements can be performed by a conventional type of neutron-density logging device or other suitable tool measurements that combine nuclear, density, lithology tools for ELAN logging analysis (e.g., tool 43 of FIG. 2).

At 503, the formation resistivity $R_i$ at a number of radial depths of investigation (e.g., where i=1, . . . , N for a number of radial DOI) is obtained at multiple depths in the wellbore from well logging measurements at the multiple depths in the wellbore. Such well logging measurements can be performed by a multi-depth induction logging tool or lateral log tool (e.g., tool 41 of FIG. 2).

At 505, the water saturation $S_{w,XO}$ of the flushed zone at the multiple depths in the wellbore is obtained from well logging measurements at the multiple depths in the wellbore. Such well logging measurements can be performed by an NMR tool or dielectric tool (e.g., tool 45 of FIG. 2).

At 507, a physics model is used to model the mud-filtrate invasion process to determine the radial distribution of water saturation and salt concentration and possibly additional useful parameters for the multiple depths. In embodiments, the physics model can be based on two-phase, three-component (oil, water, salt) porous medium fluid-flow model as described in Liang, L., Abubakar, A., and Habashy, T. M., 2011, "Estimating petrophysical parameters and average mud-filtrate invasion rates using joint inversion of induction logging and pressure transient data," Geophysics, 76(2), E21-E34; or Ramakrishnan, T. S., and Wilkinson, D. J., 1999, "Water-Cut and Fractional-Flow Logs From Array-Induction Measurements." Society of Petroleum Engineers. doi:10.2118/54673-PA. In another embodiment, the physics model can be based on a specifically designed spatial regularization (e.g., parameterized radial profiles of water saturation and salt concentration) to constrain the $S_{w,i}$ and $C_{w,i}$ (salt concentration), at different radial depths, given the mud-filtrate salt concentration $C_{w,mud}$, estimate of formation brine salt concentration $C_{w,form}$, $S_{w,XO}$, and other relevant parameters governing the mud-filtrate invasion process, such as the invasion volume per unit depth, viscosity ratio, relative permeabilities and capillary pressures for this flow unit, as well as the free water level. In embodiment, the physics model can be based on the assumption that the formation within the considered thickness covered by the multiple depths of the logging measurements have similar petrophysical properties.

At 509, the radial distributions of water saturation and salt concentration and possibly additional useful parameters for the multiple depths as determined in 507 is used to determine estimates for the parameters m and n of the formation. In this case, the estimated values of m and n characterize that portion (thickness) of the formation corresponding to the multiple depths of the underlying logging measurements of steps 501 to 505.

In embodiments, in 509, the physics model of 507 can be used to minimize a cost function to solve for the parameters m and n. For example, given the measurements of $\phi_{T,i}$, $C_{w,mud}$, $C_{w,form}$, and $S_{w,XO,i}$ for i=1, . . . , N depths, the best value of m, n, and $R_{w,i}$ that fits the data can be found by minimizing the following cost function:

$$\text{cost} = \Sigma_{k=1}^{N}(R_k^M - R_k^S(m,n,C_{w,mud},C_{w,form},\phi_{T,i},S_{w,XO,i},U))^2. \quad (Eq.\ 6)$$

Here $R_k^M$ are measured apparent resistivity logs, k is the channel index of resistivity logs, $R_k^S$ are simulated apparent resistivity logs by integrating the fluid-flow model, Archie's equation, and the array-resistivity tool response simulator, U represents a set of parameters (in addition to m, n, $C_{w,mud}$, $C_{w,form}$, $\phi_{T,i}$, $S_{w,XO,i}$) that are part of the physics model.

At 511, the estimates for the parameters m and n as determined in block 509 are used in an inversion process, which employs a tool response forward solver to model resistivity of the formation for the number of radial DOI at the multiple depths of block 503 given the parameters m and n. The estimates for the parameters m and n as determined in block 509 are used as the initial values of m and n in the inversion process. The inversion process adjusts the parameters m and n as input to the tool response forward modeler until the resulting resistivity model output by the tool response forward modeler matches the measured R obtained in block 503. The final values for the parameters m and n are solved for and output by the inversion process. In this case, the final values of m and n characterize that portion (thickness) of the formation corresponding to the multiple depths of the underlying logging measurements of steps 501 to 505.

In embodiments, the tool response forward solver of 511 can model array-resistivity tool responses by solving the Maxwell's equations, for example as shown in Liu, Q. H. and Chew. W. C., 1990, "Numerical mode-matching method for the multiregion vertically stratified media (EM wave propagation)," IEEE transactions on antennas and propagation, 38(4), pp. 498-506.

At 513, the values of m and n as output by the inversion process in 511 are input to a saturation model (such as the Archie saturation model of Eq. (1)) to quantify the water saturation $S_w$ of the uninvaded zone of the formation. In the case where the saturation model requires the water resistivity $R_{w,T}$ (connate water resistivity) of the uninvaded zone, the value for this parameter can be obtained from other measurements. For example, the value of $R_{w,T}$ can be obtained either from independent formation fluid measurements or from other complimentary workflows (such as those described in Grau. J., Miles, J., and Mosse, L., 2019, "Measuring Spectral Contributions of Elements in Regions In and About Borehole Using Borehole Spectroscopy Tool," PCT application PCT/US19/35231. In this case, the value of the water saturation $S_w$ calculated in 513 characterizes the uninvaded zone for that portion (thickness) of the formation corresponding to the multiple depths of the underlying logging measurements of steps 501 to 505.

Figure 6:
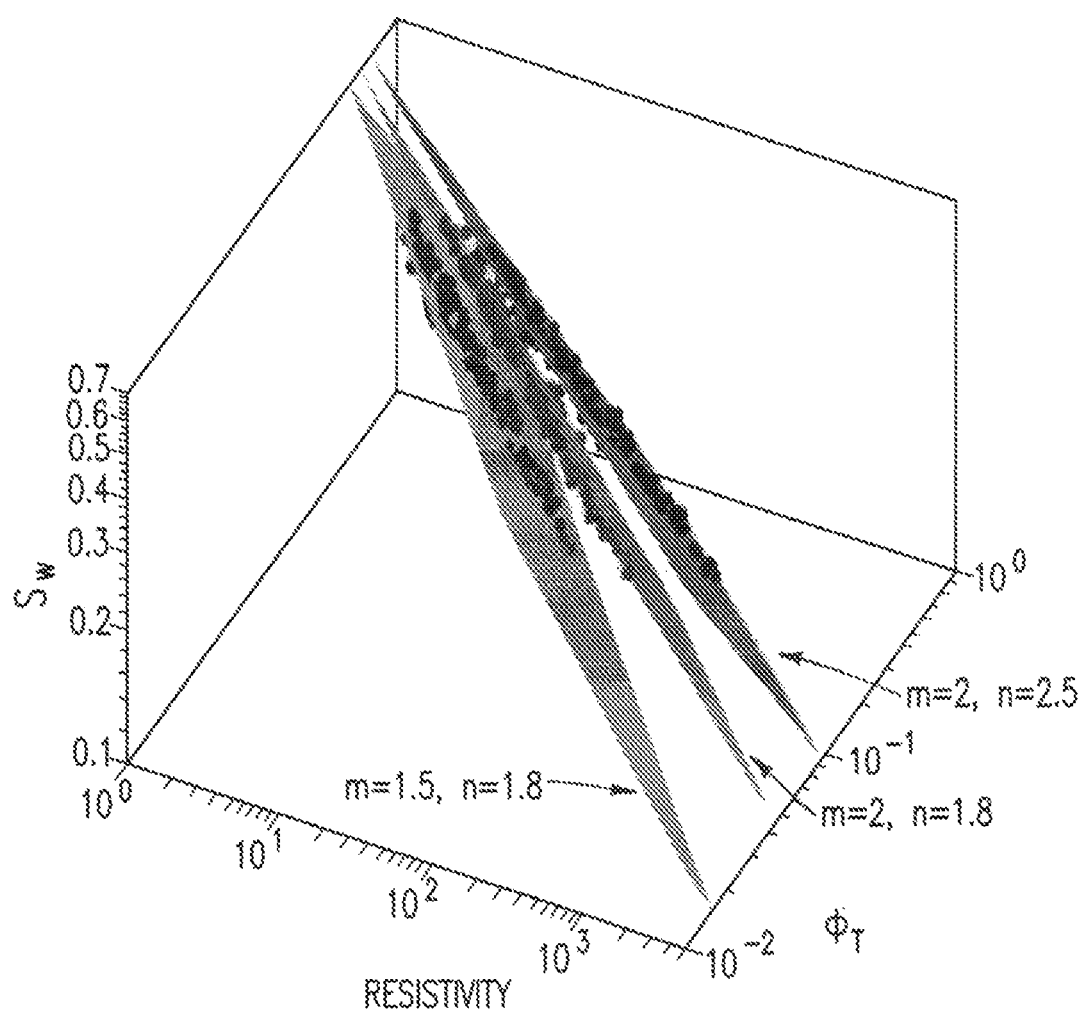
FIG. 6 is a plot of the variation of the resistivity responses in the logarithmic scale as a function of porosity and water saturation for formations with different cementation and saturation exponents.

FIG. 6 shows the variation of the resistivity responses in the logarithmic scale as a function of porosity and water saturation for formations with different cementation and saturation exponents. The separation of response for different values of m and n allows the workflows described herein to be performed reliably.

Figure 7:
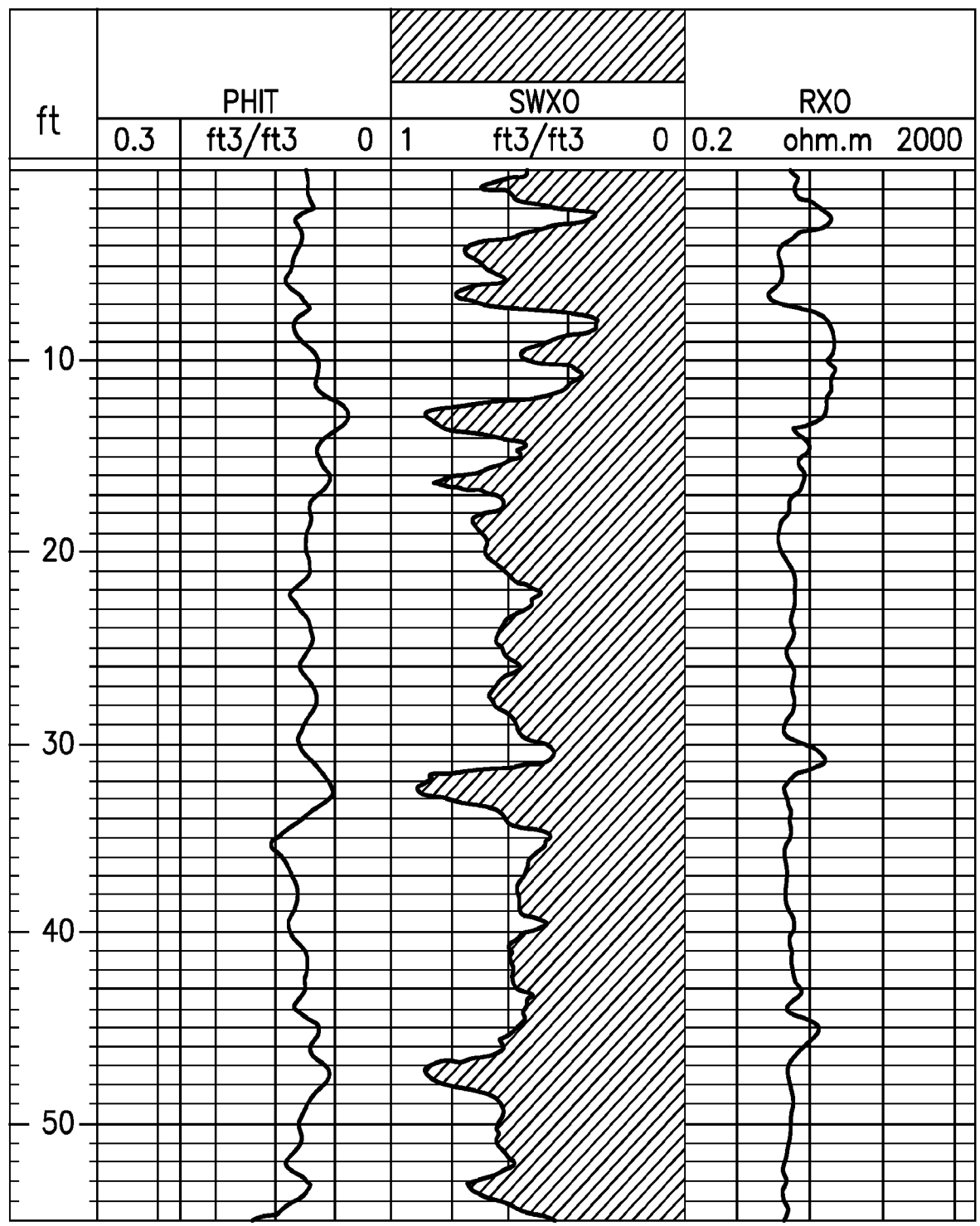
FIG. 7 shows an example of the well logging measurements that can be obtained as inputs for the workflows of FIGS. 3A-3B and 4A-4B.

FIG. 7 shows an example of the well logging measurements that can be obtained as inputs of the workflows of FIGS. 3A-3B and 4A-4B.

Figure 8:
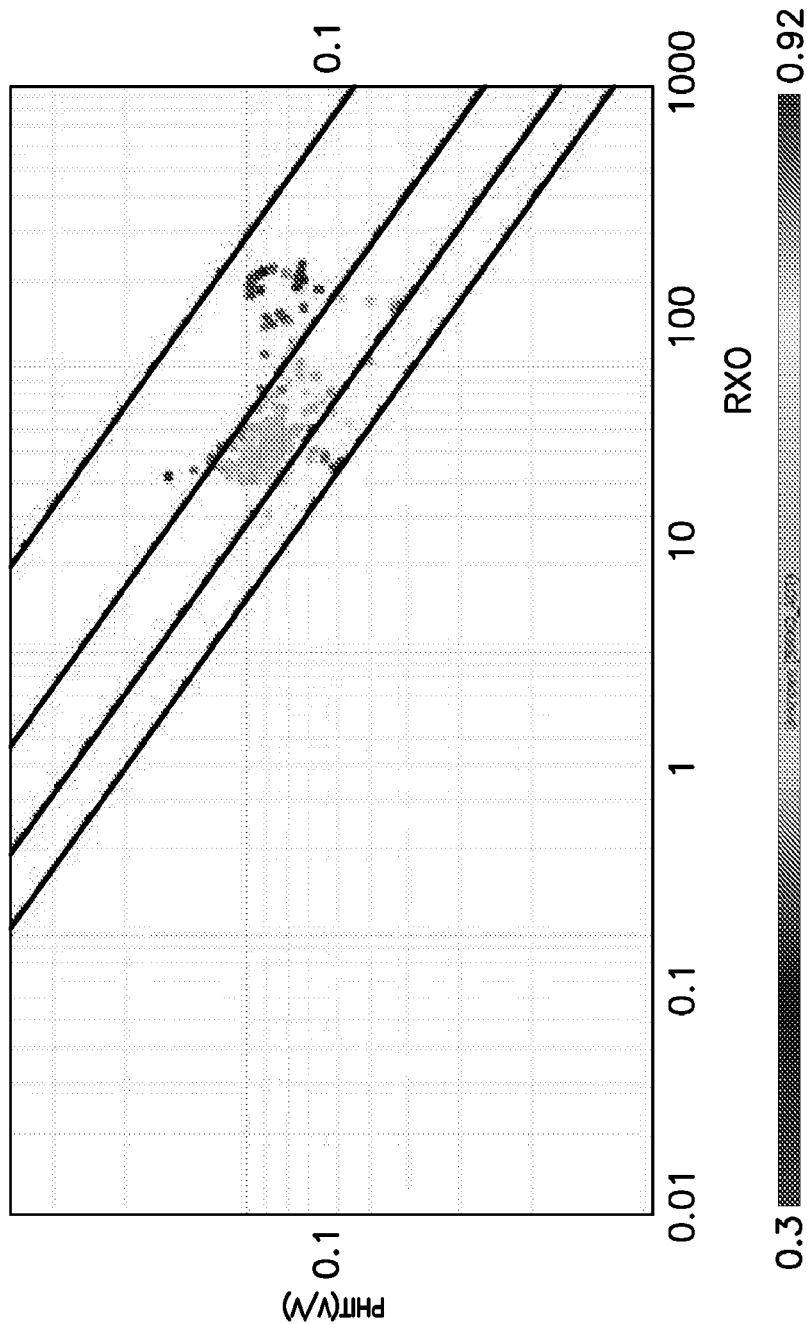
FIG. 8 shows the results for the simulated data in the $\phi_T$-$R_{XO}$ cross-plot with total porosity $\phi_T$, invaded zone resistivity $R_{XO}$, and invaded zone water saturation $S_{w,XO}$ as input.

FIG. 8 shows the results for the simulated data in the $\phi_T$-$R_{XO}$ cross-plot. With $\phi_T$, $R_{XO}$, and $S_{w,XO}$ as input, FIG. 8 demonstrates that it is possible to invert for a single set of m, n and the flush zone water resistivity $R_{w,XO}$, to represent the formation resistivity response, which can be used to further compute the water saturation $S_w$ at the uninvaded zone.

Figure 9:
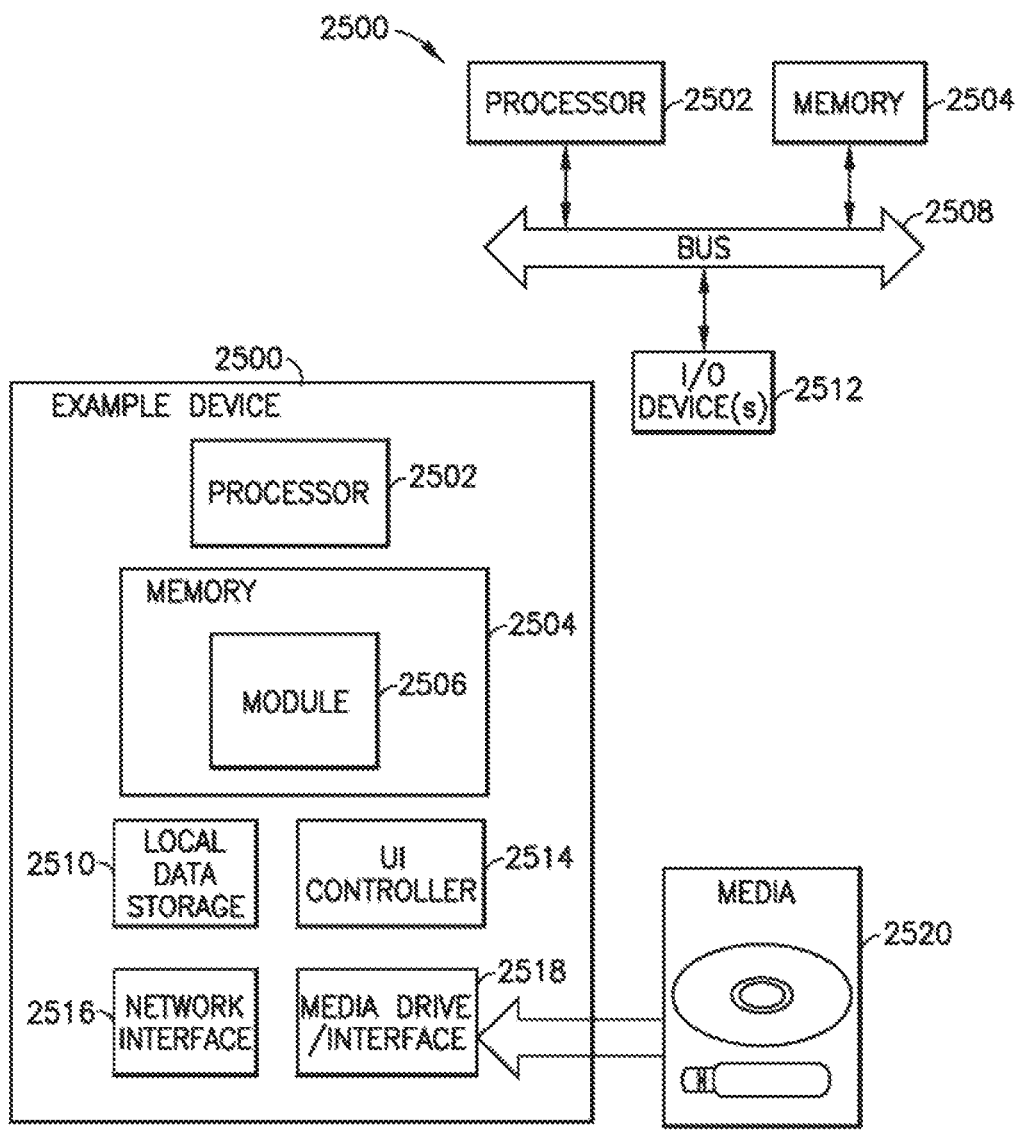
FIG. 9 is a schematic diagram of an exemplary computer processing system.

FIG. 9 illustrates an example device 2500, with a processor 2502 and memory 2504 that can be configured to implement parts or all of various embodiments of the workflows described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein one or more embodiments of methods and systems that quantify uninvaded zone water saturation from resistivity measurements of the formation in combination with other well logging measurements. It will therefore be appreciated by those skilled in the art that yet other modifications could be made to the provided invention without deviating from its spirit and scope as claimed.

What is claimed is:

1. A method of characterizing a formation traversed by a wellbore, the formation including at least a flushed zone and an uninvaded zone, the method comprising:
   a) obtaining well log data based on a plurality of different well log measurements of the formation at multiple depths in the wellbore, the plurality of different well log measurements including:
   a resistivity of the flushed zone;
   a total porosity of the uninvaded zone; and
   a water saturation of the flushed zone;
   b) using the well log data of a) as inputs to a computational model that solves for a set of petrophysical parameters that characterize a portion of the formation corresponding to the multiple depths in the wellbore, the set of petrophysical parameters including a cementation exponent, a saturation exponent, and a flushed zone water resistivity;
   c) using the set of petrophysical parameters solved for in b) to determine a value of water saturation of the uninvaded zone for the portion of the formation corresponding to the multiple depths in the wellbore; and
   d) performing a wellbore drilling operation in accordance with the determined value of water saturation of the uninvaded zone,
   wherein:
   the computation model of b) minimizes a cost function that includes the well log data of a), and
   the cost function can assume that the cementation exponent, the saturation exponent, and the flushed zone water resistivity are constant for the multiple depths, and wherein the cost function has a form of:

$$\text{cost} = \sum_{i=1}^{N} (R_{XO,i} - R_f(m, n, R_{w,XO}, \phi_{T,i}, S_{w,XO,i}))^2,$$

where:
  i represents N multiple depths from 1 to N,
  $R_{XO,i}$ is resistivity of the flushed zone at each depth i,
  m is the cementation exponent,
  n is the saturation exponent,
  $R_{w,XO}$ is the water resistivity of the flushed zone,
  $\phi_{T,i}$ is total porosity at each depth i, $S_{w,XO,i}$ is the water saturation of the flushed zone at each depth i, and $R_f(\ )$ represents an Archie equation of a form of:

$$R_f(m,n,R_w,\phi_T,S_w)=R_w\phi_T^{-m}S_w^{-n}, \text{ and}$$

where:

$R_{w,XO}$ is used for $R_w$, and $S_{w,XO,i}$ is used for $S_w$.

2. The method of claim 1, further comprising storing in computer memory or outputting the value of water saturation of the uninvaded zone as determined in c).

3. The method of claim 1, wherein the well log data of a) characterizes at least one of:

total porosity, resistivity, or conductivity of the flushed zone;

resistivity or conductivity of the formation at a set of radial depths of investigation; or the water resistivity of the flushed zone.

4. The method of claim 3, wherein:

the well log data of a) further characterizes a clay volume fraction; and the set of petrophysical parameters further includes a cation exchange capacity (CEC) or $Q_v$ parameter, where $Q_v$ is excess charge density due to clay.

5. The method of claim 1, wherein the computation model of b) is configured to:

solve for radial distribution of water saturation and salt concentration in the formation at the multiple depths;

use the radial distribution of water saturation and salt concentration to determine an estimate of the cementation exponent and the saturation exponent; and perform an inversion process that solves for the cementation exponent and the saturation exponent by matching a resistivity model generated by a tool response forward solver to measured resistivity of the formation at the multiple depths of investigation.

6. The method of claim 1, wherein the operations of a) to c) are performed by a processor.

7. The method of claim 1, further comprising operating a plurality of different logging tools to perform the plurality of different well log measurements of the formation at the multiple depths in the wellbore.

8. A system for characterizing a formation traversed by a wellbore, the formation including at least a flushed zone and an uninvaded zone, the system comprising:

at least one computer processor configured to perform operations including:

a) obtaining well log data based on a plurality of different well log measurements of the formation at multiple depths in the wellbore, the plurality of different well log measurements including:

a resistivity of the flushed zone;

a total porosity of the uninvaded zone; and a water saturation of the flushed zone;

b) using the well log data of a) as inputs to a computational model that solves for a set of petrophysical parameters that characterize a portion of the formation corresponding to the multiple depths in the wellbore, the set of petrophysical parameters including a cementation exponent, a saturation exponent, and a flushed zone water resistivity;

c) using the set of petrophysical parameters solved for in b) to determine a value of water saturation of the uninvaded zone for the portion of the formation corresponding to the multiple depths in the wellbore; and d) managing performing a wellbore drilling operation in accordance with the determined value of water saturation of the uninvaded zone, wherein:

the computation model of b) reduces or minimizes a cost function that includes the well log data of a), and the cost function can assume that the cementation exponent, the saturation exponent, and the flushed zone water resistivity are constant for the multiple depths, and wherein the cost function has a form of:

$$\text{cost} = \sum_{i=1}^{N} (R_{XO,i} - R_f(m, n, R_{w,XO}, \phi_{T,i}, S_{w,XO,i}))^2,$$

where:

i represents N multiple depths from 1 to N, $R_{XO,i}$ is resistivity of the flushed zone at each depth i, m is the cementation exponent, n is the saturation exponent, $R_{w,XO}$ is the water resistivity of the flushed zone, $\phi_{T,i}$ is total porosity at each depth i, $S_{w,XO,i}$ is the water saturation of the flushed zone at each depth i, and $R_f(\ )$ represents an Archie equation of a form of:

$$R_f(m,n,R_w,\phi_T,S_w)=R_w\phi_T^{-m}S_w^{-n}, \text{ and}$$

where:

$R_{w,XO}$ is used for $R_w$, and $S_{w,XO,i}$ is used for $S_w$.

9. The system of claim 8, wherein the at least one computer process is configured to store in computer memory or output the value of water saturation of the uninvaded zone as determined in c).

10. The system of claim 8, wherein the well log data of a) characterizes at least one of:

total porosity, resistivity, or conductivity of the flushed zone;

resistivity or conductivity of the formation at a set of radial depths of investigation; or the water resistivity of the flushed zone.

11. The system of claim 10, wherein:

the well log data of a) further characterizes a clay volume fraction; and the set of petrophysical parameters further includes a cation exchange capacity (CEC) or $Q_v$ parameter, where $Q_v$ is excess charge density due to clay.

12. The system of claim 8, wherein the computation model of b) is configured to:

solve for radial distribution of water saturation and salt concentration in the formation at the multiple depths;

use the radial distribution of water saturation and salt concentration to determine an estimate of the cementation exponent and the saturation exponent; and perform an inversion process that solves for the cementation exponent and the saturation exponent by matching a resistivity model generated by a tool response forward solver to measured resistivity of the formation at the multiple depths of investigation.

13. The system of claim 8, wherein the measurement of the water saturation of the flushed zone is obtained by at least one of: a dielectric logging tool or a nuclear magnetic resonance (NMR) logging tool.

14. The system of claim 8, wherein a plurality of different logging tools are configured to perform the plurality of different well log measurements of the formation at the multiple depths in the wellbore.

\* \* \* \* \*